United States Patent
Bendel et al.

(10) Patent No.: US 7,206,803 B1
(45) Date of Patent: Apr. 17, 2007

(54) METHOD AND APPARATUS FOR CONTROLLING ACCESS TO THE CONTENTS OF WEB PAGES BY USING A MOBILE SECURITY MODULE

(75) Inventors: Peter Bendel, Boeblingen (DE);
Thomas Schaeck, Achern (DE);
Roland Weber, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 09/584,605

(22) Filed: May 31, 2000

(30) Foreign Application Priority Data

Aug. 19, 1999 (DE) ................................. 199 39 281

(51) Int. Cl.
*G06F 15/16* (2006.01)
(52) U.S. Cl. ................... 709/202; 709/203; 709/217; 709/219; 709/225; 713/155; 713/159; 713/165; 726/2
(58) Field of Classification Search ................ 713/176, 713/201, 182, 184, 185
See application file for complete search history.

(56) References Cited

U.S. PATENT DOCUMENTS

| | | | | |
|---|---|---|---|---|
| 5,668,878 A | * | 9/1997 | Brands | 380/30 |
| 5,757,918 A | * | 5/1998 | Hopkins | 705/67 |
| 5,875,395 A | * | 2/1999 | Holmes | 455/420 |
| 5,910,989 A | * | 6/1999 | Naccache | 713/173 |
| 6,052,785 A | * | 4/2000 | Lin et al. | 713/201 |
| 6,065,120 A | * | 5/2000 | Laursen et al. | 713/201 |
| 6,076,108 A | * | 6/2000 | Courts et al. | 709/227 |
| 6,178,504 B1 | * | 1/2001 | Fieres et al. | 713/164 |
| 6,195,651 B1 | * | 2/2001 | Handel et al. | 707/2 |
| 6,339,765 B1 | * | 1/2002 | Maher | 705/41 |
| 6,480,957 B1 | * | 11/2002 | Liao et al. | 713/170 |
| 6,643,679 B1 | * | 11/2003 | Erickson et al. | 718/101 |
| 6,668,322 B1 | * | 12/2003 | Wood et al. | 713/182 |
| 6,775,398 B1 | * | 8/2004 | Schaeck et al. | 382/124 |

\* cited by examiner

*Primary Examiner*—Syed A. Zia
(74) *Attorney, Agent, or Firm*—Duke W. Yee; Jerry W. Herndon; Mari Stewart

(57) ABSTRACT

The present invention relates to an apparatus and method for controlling access to protected web pages on a web server by using a method of authentication. The method according to the invention is divided into a general method for authenticating the client and a downstream method for granting authorization to access the protected web pages by generating a session ID of which the client is notified after successful authentication, and by inserting the session ID as part of the new request. This ensures that even the links on the protected-access web page are covered and are provided with a session ID to serve as access authorization. The session ID is preferably given a validity date. The present invention fits into the existing browser infrastructure without any alterations being needed for this purpose. The use of a chip card increases the security of the method of authentication.

20 Claims, 2 Drawing Sheets

METHOD AND APPARATUS FOR CONTROLLING ACCESS TO THE CONTENTS OF WEB PAGES BY USING A MOBILE SECURITY MODULE

TECHNICAL FIELD

The present invention relates to a method and an apparatus for controlling access to the contents of web pages by using mobile security modules and in particular chip cards.

BACKGROUND OF THE INVENTION

The internet, i.e. the World Wide Web, has become a new information-disseminating and business medium. The increasing commercialization of the internet is constantly giving rise to ideas for new types of business which can be transacted over the internet. Even today, the internet user can perform virtually all the commercial transactions involved in ordinary everyday life over the internet. In the business world too the internet has become an indispensable tool. Companies use the internet both for developing and for marketing their products.

However, there are also dangers to these opportunities offered by the internet. To an increasing extent, even confidential information is being exchanged between clients and servers over the internet. This is particularly true of the exchange of confidential knowhow. The client and the server therefore need to be sure that access to the confidential information is impossible while it is being transmitted over the internet. As well as this it must also be ensured that the authenticity of the receiver of the confidential information can be relied on. Finally, more and more providers of web servers are starting to restrict access to web contents, i.e. are permitting access only in return for the input of a user ID and password. In the prior art there are certain methods which have become established on guaranteeing authenticity between client and server and of ensuring that no unauthorized access is possible during transmission.

Where access to web pages is restricted by means of a user ID and password, the browser is told that this is the case and it then opens a dialog box to allow a user ID and/or a password to be entered. Once the user ID and password have been entered, the browser sends them to the web server and if they are correct the latter opens access to the web pages.

A disadvantage of this method lies in the alloting and management of the user ID's and passwords may be misused by unauthorized persons or may be listened in on by such persons when they are being transmitted from the client to the web server.

In an improved method the web server stores the client's TCP/IP address in a table. The TCP/IP address is thus considered to be authorized. A disadvantage of this method is that the TCP/IP address of the authorized client can be replaced by another TCP/IP address belonging to an unauthorized client if the unauthorized client has covertly found out the user ID and password. When this is the case the unauthorized person can still again access to the web server.

SSL (secure socket layer) is a transmission protocol for the secure transmission of information. Contemporary browsers largely support this protocol. Browsers which support SSL contain a database holding certificates for public keys. Each public key is certified by a certificate issued by a recognized certification center. The protected-access web server contains a private key, with one public key being assigned to each such private key. For the public key in question, there is also a certificate on the web server.

The web server sends the certificate to the client. The certificate comprises the public key, identity data and a signature. The signature was generated by the web server by means of the private key. The client checks the validity of the certificate by reference to the certificates held in store and generates a signature by using an encryption algorithm and the public key. If the signature in the certificate is the same as the signature generated, the server has authenticated itself.

The same method can also be used to authenticate the client.

In this case too it is essential for the client to have a private key and a certificate.

The private key must be protected against access. Therefore it must not be stored on the client's hard disk. As an alternative to this the private key can be stored on a card. What is a disadvantage in this case however is that the card has to be capable of performing a public key procedure and to do this it requires a cryptographic co-processor. This however makes the card expensive.

To provide a secure channel for communications, the SSL protocol makes it possible for the information for transmission to be encrypted by means of a session key on which the client and the web server have agreed. The session key is a symmetrical key. It is used to encrypt the information which is going to be transmitted.

SUMMARY OF THE INVENTION

The object of the present invention is to provide a method and an apparatus which avoid the disadvantages, as outlined above, of the prior art for achieving authentication between client and server.

This object and other advantageous embodiments of the present invention are described in the instant claims.

The main advantage of the present invention lies in the fact that the control of access to web pages in accordance with the invention does not require any changes to existing browsers. Also, the use of a chip card increases the security of the method of authentication employed in the present case.

BRIEF DESCRIPTION OF THE DRAWINGS

The present invention will be described by reference to a preferred embodiment and to the drawings, in which.

DETAILED DESCRIPTION OF THE PREFERRED EMBODIMENTS

Figure 1:
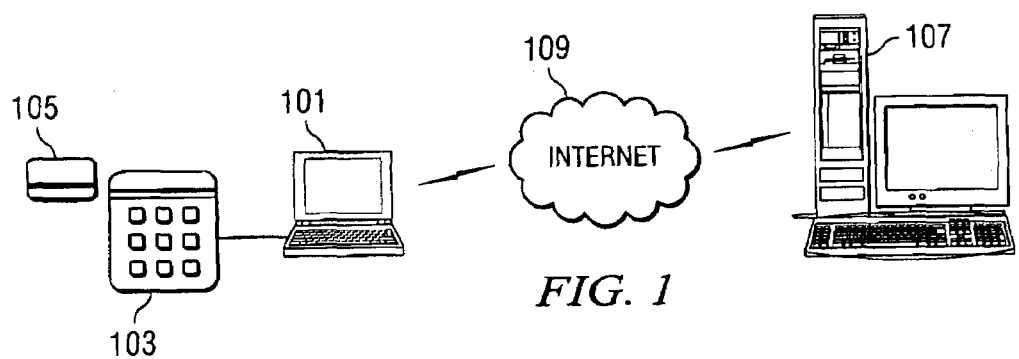
FIG. 1 shows the components on which the present invention is based.

FIG. 1 shows the components for implementing the present invention. Installed on the client side there are a data-processing unit with a browser, a card reader and a mobile security module, e.g. a chip card. The browser is capable of displaying HTML pages and of running applets in its virtual machine (JVM=Java virtual machine). Applets are programs written in the Java programming language which are downloaded from the web server together with the web page. The function which the applets perform is to communicate with the chip card, e.g. by using APDU's (=application protocol data units). To communicate with the card, the applet requires a program library. This is necessary because communication is not one of the browser's standard functions. The chip card needs to be capable of calculating a cryptographic checksum or generating a digital signature by means of a key. The key is located in a protected area of the chip card. In addition to this, the individual member of the card is preferably also stored on it.

On the server side there is a web server or data-processing unit which can handle HTTP requests from the client (an HTTP server).

The server is also capable of calling up not only static HTML pages but also programs (CGI=common gateway interface) or servlets. Servlets are programs written in Java which are used on web servers. The function which the servlets perform in the present invention is to verify the cryptographic checksum (or digital signature) generated on the client's side and thus to warrant the authenticity of the client to the web server.

The web server may have a protected area which is only accessible via an access control and an unprotected area to which access can be gained without access control.

The client and web server are connected via a data-carrying connection, e.g. the internet or an intranet, and communicate by means of a standard transmission protocol, e.g. TCP/IP.

To obtain a further increase in the security of the method, according to the invention, against snooping, SSL (secure sockets layer) is proposed as the transmission protocol.

Figure 2:
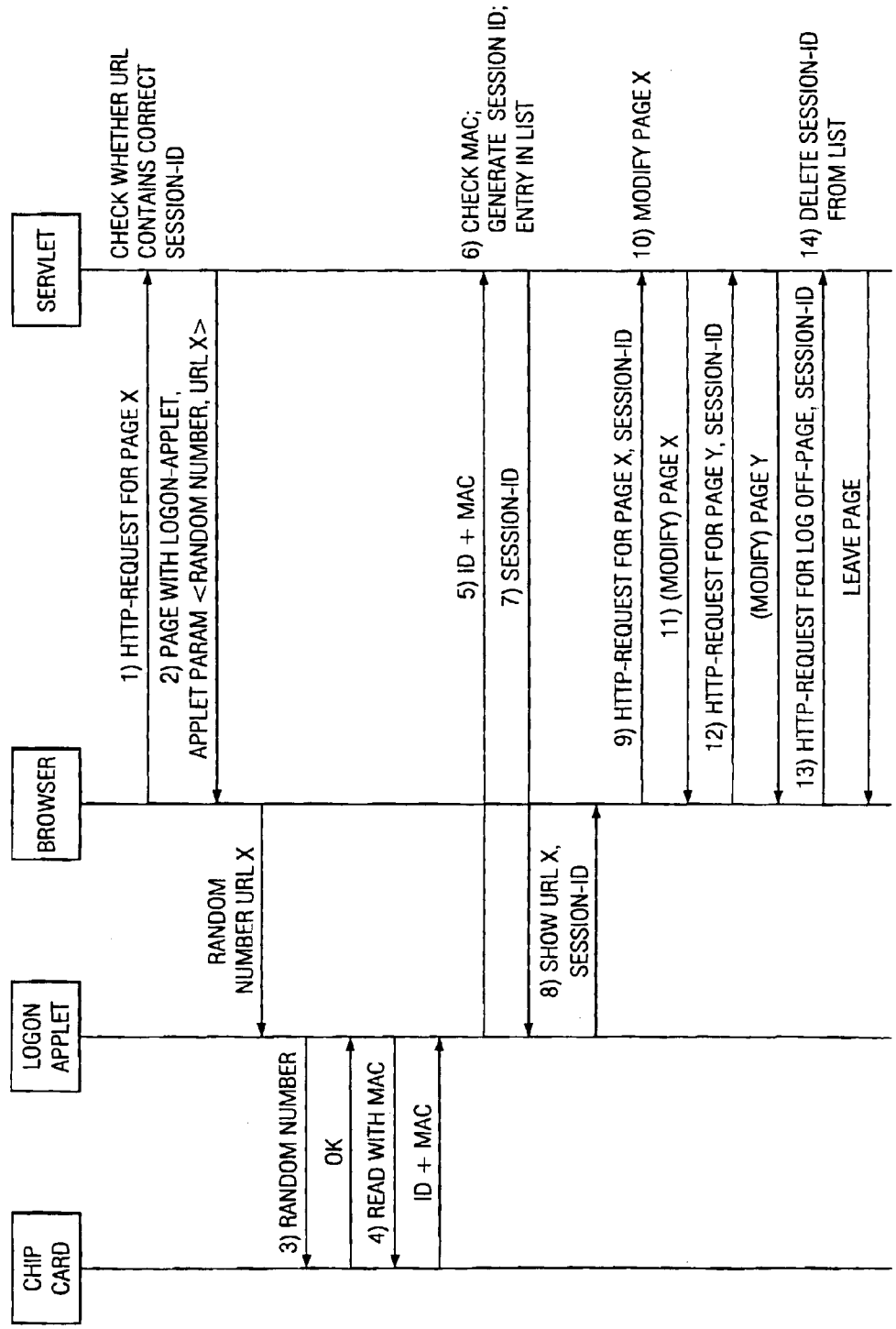
FIG. 2 shows the method according to the invention for authentication and access control.

The procedural sequence for the method according to the invention of controlling access to protected web pages on a web server is shown in detail in FIG. 2. The method according to the invention comprises the following steps:

1. By entering a URL (uniform resource locator), the client requests a protected web page on a web server (HTTP request for page X). This request from the client causes a servlet to be started on the web server. By referring to a list, the servlet checks whether the URL contains a valid session ID as a parameter. A session ID is a prerequisite for access to a protected web page. If the session ID is included in the list, the process continues as detailed in step 10 below. If it is not (if this is an initial contact), authentication begins as detailed in step 2.

2. The servlet sends to the client an authentication page which contains an authentication applet. The authentication applet is parametrized with a random number which was generated by the servlet and with the URL address of the page originally requested (HTTP request for page X). The authentication applet is preferably stored in the client's volatile memory and run or activated by the browser.

3. The applet asks the user to identify himself by means of a chip card and initiates communication with the chip card, preferably by means of APDU's. The applet transmits the random number to the chip card.

4. Using a key which is stored in the protected area on the chip card, the card calculates a cryptographic checksum or digital signature from the random number and its own card number. The checksum/digital signature and the card number are sent back to the applet.

5. The applet then makes a connection to the servlet on the web server and passes this data to the servlet.

6. The servlet checks to see whether the cryptographic checksum/signature is correct using a key which matches the chip card. Where the encryption process is symmetrical, the servlet is in possession of the same key; where it is asymmetrical, the servlet is in possession of the public key.

a) If the check sum does not agree, the servlet sends a negative answer to the applet. The applet shows the user an error message.

b) If the checksum is correct, the servlet generates a unique session ID from a large range of values to prevents its being discovered by a targeted search made by an unauthorized person.

The session ID is preferably provided with an expiry date and is entered in the servlet's list of valid session ID's. The session ID shows that the user in question is an authorized user for all requests within the session. The session ID loses its validity when:

a fixed period has expired, the session is terminated by means of a log-off page.

7. The session ID is transmitted by the servlet to the applet. The applet preferably confirms the successful authentication.

8. At the end of step 7 of the method, the applet has the following information available to it:

the URL address for page X, as originally requested, from step 3 the session ID from step 7.

From this information the applet generates a new URL, with the new URL comprising the original address and the session ID, and transmits it to the browser. The applet has thus completed its duties.

9. The browser requests the web page in question from the web server.

10. The request for page X causes the servlet to be called up in the server. The servlet checks for the presence of the session ID in the URL as described in step 1. If the session ID is present, the servlet checks to see whether it is contained in the list and, if it is, to see whether a validity date, if it has one, has expired.

If all the requirements for access are satisfied, the web page requested is loaded into the memory of the web server and processed. In the course of the processing, the web page in question is searched for any links to other web pages located in the area to which access is controlled. If any links of this kind are found, the user's session ID is added to them. It is preferable for an additional link for terminating the session, which also contains the session ID, to be inserted at the end of the page which was called up (see step 13).

11. The servlet transmits the page, with the modified links, to the client.

12. If, on the page displayed, the user follows a link which points to the protected area, this link will already include the session ID needed for authentication and this page will therefore be transmitted to the client without any renewed authentication as in step 2 et seq.

13. Events which specifically terminate the session and cause the session ID to be lost are:

selection of the link for logging off (see step 10)

expiry of the period of time for which a session ID has been alloted.

14. The servlet receives the log-off request from step 13 and deletes the session ID contained in the log-off request from the list of valid session ID's. The servlet preferably confirms to the user that the session is over.

The invention claimed is:

1. A computer implemented method for controlling access to protected contents on a server using a mobile security module, the computer implemented method requiring the following components to be present:

a) a server;

b) a client;

c) a reader for a mobile security module;

d) a mobile security module associated with the client and having at least one protected area for storing a key; and e) a data line for communications between client and server; and wherein the computer implemented method comprises the following steps:

aa) sending to the server of a request to call up protected-access contents;

bb) sending from the server to the client of an authentication module to be run in the client;

cc) execution of an authentication protocol for authenticating the mobile security module and, where appropriate, its holder by means of the authentication module, wherein the authentication protocol is executed in the followed steps:

generation of a random number by the server application when the content requested is access-protected and the requirements for access have not been satisfied, and sending of the random number to the authentication module;

sending of the random number from the authentication module to the mobile security module;

generation in the mobile security module of a digital signature which takes account of the identity number of the mobile security module, the random number and the key of the mobile security module, wherein the digital signature is generated by means of a symmetrical encryption algorithm with the help of a secret key agreed between client and server, or by means of an asymmetrical encryption algorithm with the help of a private key, the server being in possession of the public key;

sending of the digital signature to the server; and checking of the correctness of the digital signature using the securing module of the server;

dd) if the authentication in step cc) was successful, addition to the request in step aa) of a session ID which was generated in the course of the communications between the authentication module and the server;

ee) sending of the new request to the server application;

ff) checking of the session ID in the request to see that it is recorded in the server;

gg) processing of the content requested for transmission and searching of the contents for further links to other protected-access contents;

hh) addition of the session ID to the links identified; and ii) sending of the content modified as in step hh) to the client.

2. Method according to claim 1, characterized in that the server is a web server and the protected contents are web pages which are called up via a browser by a URL request from a client.

3. Method according to claim 2, characterized in that the server application is a servlet and the client authentication module is an authentication applet and in that on receipt of a URL request the servlet checks the URL request for the presence of a session ID and if there is no session ID present sends an authentication applet containing a random number to the client.

4. Method according to claim 1, characterized in that the symmetrical encryption algorithm is DES or triple DES and the asymmetrical encryption algorithm is RSA, DSA or an elliptic curve algorithm.

5. Method according to claim 3, characterized in that if the digital signature does not agree, the servlet sends an error message to the client applet.

6. Method according to claim 1, characterized in that the session ID is given a period of validity, and wherein the session ID loses its validity on expiry of a fixed time or when a session is terminated by means of a log-off page.

7. Method according to claim 1, characterized in that the session ID generated in step dd) is recorded in a table and in that the presence of an entry in the table is a requirement for access to all the protected-access pages.

8. A computer implemented method, in a client, for controlling access to protected contents using a mobile security module, the computer implemented method comprising:

sending a request for protected content to a server;

receiving an authentication applet and a random number from the server, wherein the random number is generated at the server;

executing the authentication applet, wherein the authentication applet initiates communication with a mobile security module associated with the client;

sending, by the authentication applet, the random number to the mobile security module, wherein the mobile security module includes a cryptographic key and wherein the mobile security module generates a cryptographic signature based on the key and the random number;

receiving, by the authentication applet, the cryptographic signature from the mobile security module;

sending, by the authentication applet, the cryptographic signature to the server; and responsive to the server authenticating the cryptographic signature, receiving a session identifier from the server.

9. The method of claim 8, further comprising:

sending a second request for the protected content to the server, wherein the second request includes the session identifier.

10. The method of claim 8, wherein the mobile security module includes an individual number for the mobile security module and wherein the mobile security module generates the cryptographic signature based on the individual number.

11. The method of claim 10, further comprising:

receiving, by the authentication applet, the individual number from the mobile security module; and sending, by the authentication applet, the individual number to the server for authentication.

12. An apparatus, in a client, for controlling access to protected contents using a mobile security module, the apparatus comprising:

means for sending a request for protected content to a server;

means for receiving an authentication applet and a random number from the server, wherein the random number is generated at the server;

means for executing the authentication applet, wherein the authentication applet initiates communication with a mobile security module associated with the client;

means for sending, by the authentication applet, the random number to the mobile security module, wherein the mobile security module includes a cryptographic key and wherein the mobile security module generates a cryptographic signature based on the key and the random number;

means for receiving, by the authentication applet, the cryptographic signature from the mobile security module;

means for sending, by the authentication applet, the cryptographic signature to the server; and means for responsive to the server authenticating the cryptographic signature, receiving a session identifier from the server.

13. The apparatus of claim 12, further comprising:
means for sending a second request for the protected content to the server, wherein the second request includes the session identifier.

14. The apparatus of claim 12, wherein the mobile security module includes an individual number for the mobile security module and wherein the mobile security module generates the cryptographic signature based on the individual number.

15. The apparatus of claim 14, further comprising:
means for receiving, by the authentication applet, the individual number from the mobile security module; and
means for sending, by the authentication applet, the individual number to the server for authentication.

16. The apparatus of claim 12, wherein the mobile security module is a chip card and wherein the client includes a chip card reader.

17. The apparatus of claim 12, wherein the client is a Web client, wherein the server is a Web server, and wherein the protected content is a Web page.

18. A computer program product, in a computer readable medium, for controlling access to protected contents using a mobile security module, the computer program product comprising:
instructions for sending a request for protected content to a server;
instructions for receiving an authentication applet and a random number from the server, wherein the random number is generated at the server;
instructions for executing the authentication applet, wherein the authentication applet initiates communication with a mobile security module associated with the client, and wherein the mobile security module is a chip card, and wherein the applet is configured to perform the following steps:
send the random number to a mobile security module, wherein the mobile security module includes a cryptographic key and wherein the mobile security module generates a cryptographic signature based on the key and the random number;
receive the cryptographic signature from the mobile security module;
send the cryptographic signature to the server; and
responsive to the server authenticating the cryptographic signature, receive a session identifier from the server.

19. The computer implemented method of claim 1, wherein the mobile security module is a chip card and wherein the client includes a chip card reader.

20. The computer implemented method of claim 8, wherein the mobile security module is a chip card and wherein the client includes a chip card reader.

* * * * *